Patented Apr. 3, 1945

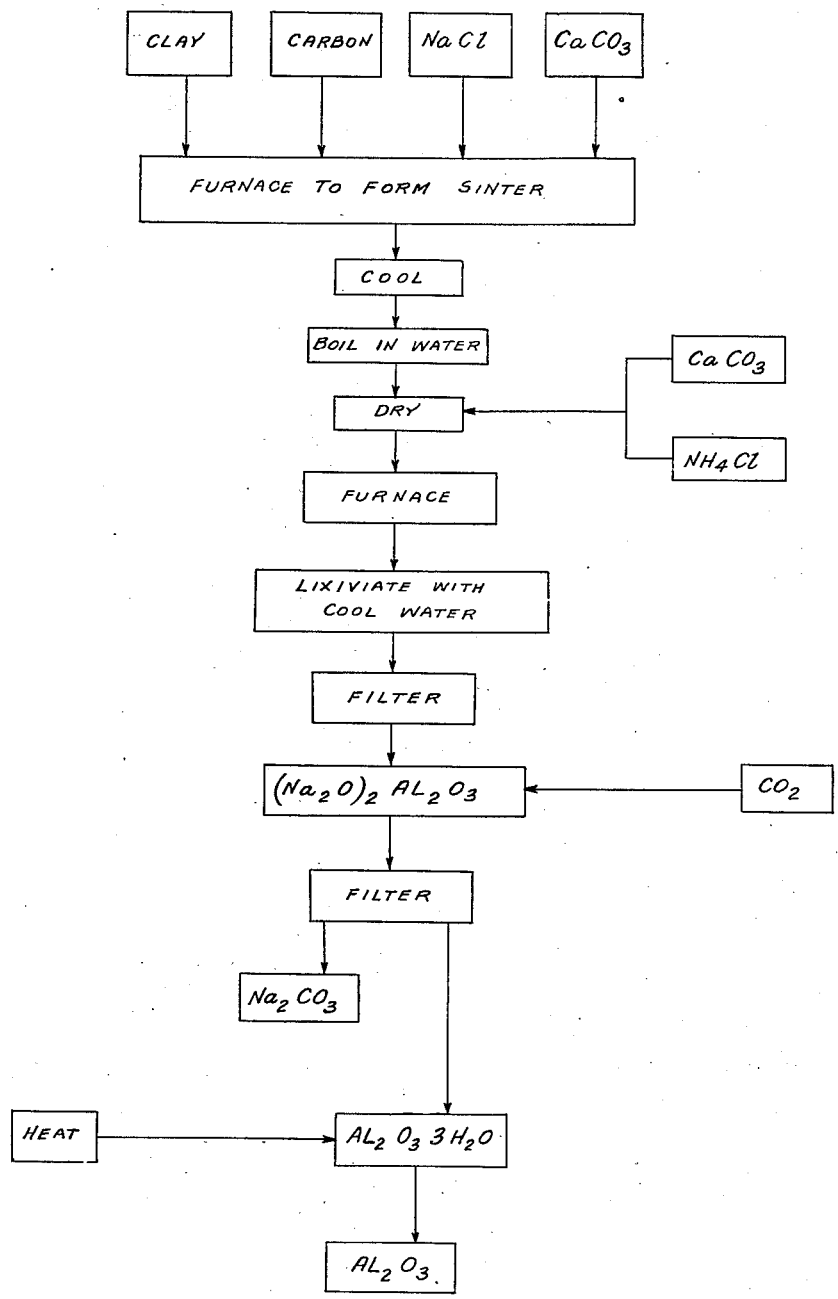

2,372,819

UNITED STATES PATENT OFFICE 2,372,819

PROCESS FOR MAKING ALKALI METAL ALUMINATE

Elbert E. Fisher, St. Louis, Mo., assignor to Marlew W. Fisher, St. Louis, Mo.

Application August 1, 1941, Serial No. 404,972

7 Claims. (Cl. 23—52)

My invention relates to an improved process for making alkali metal aluminate.

One of the objects of my invention is to provide an improved process for treating aluminous siliceous materials such as clay and the like to thereby separate a sodium salt in the form of sodium aluminate from the other substances present such as silica, titanium, iron, calcium, and so forth.

Another object of my invention is to provide an improved method of making soluble sodium aluminate from an aluminous material, which process can be carried on in a continuous manner and by employing raw material having either a low or a high percentage of alumina or a mixture of both.

Still another object of my invention is to provide a new process whereby substantially the total amount of alumina in the aluminous material can be recovered without its being contaminated with other substances, particularly silica or compounds thereof, iron, titanium and so forth.

A more general object of my invention is to provide a simple and economical method whereby commercially usable alumina may be recovered from cheap and readily available raw material.

Yet another object of my invention is to so provide an improved method of obtaining a soluble aluminum salt from an aluminous material that other salts can also be readily created from the vehicle employed to provide the solubility of the aluminum salt.

The accompanying drawing shows a flow sheet of the process embodying my invention.

In using this improved process, the material to be used is ground fine and mixed with powdered coal, powdered limestone, soda chloride, in presence of sufficient water to make a stiff paste, which is then placed in a revolving furnace where it is first slowly dried, leaving the mixed materials in the form of unevenly sized lumps, passing them into the hotter zone of the furnace where the mixture is subjected to a heat not to exceed a temperature of 1750° F. for five hours. This heat may be produced from coal, gas, oil— or whatever style is deemed best, and is mixed with steam or water vapor, and is desirably a neutral rather than an oxidizing flame. The gases evolved are conducted through a chamber of limestone in lumps which are continuously wet with water, creating a solution of calcium chloride.

When the mixed raw materials have passed through the furnace, they are placed in a receptacle, covered with water, and boiled for a limited time, then dried, mixed with a mixture of calcium carbonate and ammonium chloride, and again passed through a rotating furnace heated to a dull red heat of about 1350° F. The resulting product is then lixiviated with water to create a dilute solution. This may be evaporated to form sodium aluminate or be kept in solution to be impregnated with whatever gas it is to be deemed desirable, as for instance, when sodium sulfide is desired, the hydrogen sulfide gas is passed through the soda aluminate solution, during which time the gas reacts with the sodium which is the vehicle causing the alumina to remain in solution. Deprived of this vehicle, the alumina is instantly precipitated as alumina hydroxide, $Al_2O_3.3H_2O$. The sodium then becomes at first a sodium hydroxide, then changing to sulfide as larger quantities of the gas are passed through the solution, eventually becoming sodium sulfide plus water of crystallization $Na_2S$ plus $Al_2O_3.3H_2O$. When commercially prepared, the sodium sulfide may be fused or crystallized, while the alumina may be dried as the hydroxide or heated and burned to form the oxide.

In place of hydrogen sulfide being used to form the sulfide, the sulfite may be obtained as well as other salts of sodium.

As an illustration of the process, the following materials with approximate amounts used are mixed with a little water.

| | Pounds |
|---|---|
| Clay | 160 |
| Coal | 30 |
| Sodium chloride | 320 |
| Limestone | 100 | heated slowly to 1750° F. for about 5 hours, placed in a receptacle, covered with water, and boiled, dried, mixed with 10 pounds of a mixture of calcium carbonate and ammonium chloride in the proportion of 6 of calcium to 1 of ammonia and heated to approximately 1350° F. for an hour or two. This is then lixiviated in water.

This watery solution is then evaporated or carried out ready for further use. As a further example such as the manufacture of sodium sulfide, the hydrogen sulfide is discharged into gas towers in which sprays of the sodium aluminate are passing. The solution, now containing varying qualities of the aluminate, the sodium sulfide and alumina, falls, passes through filters which separate the alumina as fast as made. The alumina is retained while the clear, weakened solution is again passed through and this method continued until all the alumina and all the sodium is exhausted.

The material resulting from the first step, i. e. that which is removed from the furnace which has been heated to 1750° F. consists of both sodium aluminate and an insoluble so-called sodium silico aluminate with silicic acid, as well as calcium oxide, calcium silicate and the impurities. When this is placed in water and boiled, the completed sodium aluminate is formed and simultaneously freed from the other material. There is also present an excess of sodium, and this is converted into the hydroxide by reacting with the calcium oxide present. Thus there is obtained in solution alumina in excess of that combined with the sodium in the sintered mixture. Some of the sodium silico aluminate with the silicic acid combines with the sodium hydroxide, and as the mass is slowly dried the silicic acid becomes eventually, as the heat is increased, silica, and the rest of the silica combines with the calcium in the presence of ammonium chloride to become calcium silicate, so that when added to water there is present traces of calcium chloride, calcium oxide, silica and the other impurities, with sodium aluminate in solution. This is largely due to the triple effect of the sodium. The alumina present in the so-called sodium silico aluminate has first been acted upon by the sodium hydroxide while in solution, next by the same sodium hydroxide in the dried then heated form, while afterwards by this same sodium in the partial form of the carbonate. This carbonate is formed by the action of carbon dioxide, this carbon dioxide being the result of the products of combustion from the fuel used to create the heat, which transposes upwards of 80% of the hydroxide to the carbonate form.

By this method a large portion of that which has hitherto resulted in an insoluble so-called sodium silico aluminate is now soluble sodium aluminate and insoluble silica, as it has been found that the processes heretofore used have been contaminated with silicic acid in the ortho form, $H_4SiO_4$ and which has not been separated; while with the above described triple effect method, means have been found to segregate this silicic acid, recovering a large portion of the heretofore lost percentage of possible convertible alumina, as this form of silicic acid is soluble in alkalies and rendered insoluble when heated to a dull red heat with ammonia chloride and calcium carbonate. While there is present during the latter portion of the process, sodium, alumina and silica, all in the soluble form, the method when closing transposes the silica to the insoluble form without disturbance to the sodium and the alumina which are combined, forming sodium aluminate. This is then dissolved in water, filtered, and, if used for sodium sulfide or other sodium salts is in the solution ready for use.

These methods may be modified by those skilled in the art and what I claim is:

1. In a process for obtaining alumina from an aluminous siliceous material, the steps comprising boiling in water a sintered mixture of the material containing an alkali metal oxide to obtain in solution alumina in excess of that combined with the alkali in the sintered mixture and the adding to the resulting mixture ammonium chloride and available calcium and the heating thereof, to a temperature giving a dull red color to cause substantially all the soluble silica compounds to become insoluble by uniting with the calcium to thereby permit the silica to be separated from the sodium aluminate.

2. In a process for obtaining alumina from an aluminous siliceous material, the steps comprising boiling in water a sintered mixture of the material containing a sodium oxide to obtain in solution alumina in excess of that combined with the sodium in the sintered mixture, and then adding to the resulting mixture ammonium chloride and calcium carbonate and heating thereof to approximately 1350 degrees Fahrenheit to cause soluble silica compounds to become an insoluble calcium silicate to thereby permit the silica to be separated from the sodium aluminate by filtering.

3. A process of treating aluminous siliceous material which comprises heating the material and a sodium compound and a calcium compound to approximately 1750 degrees Fahrenheit to form calcium silicate and sodium oxide, boiling the mixture in water to place the alumina in solution together with alumina not already united with sodium in the heating step, and then creating an insoluble calcium silicate by adding ammonium chloride and calcium carbonate and subjecting to such temperature that the mixture will have a dull red glow.

4. A process of treating aluminous siliceous material which comprises sintering a mixture containing the material, calcium carbonate and a sodium compound, boiling the mixture in water to obtain in solution alumina in excess of that combined with the sodium in the sintered mixture, and adding to the resulting mixture ammonium chloride and available calcium and heating thereof to approximately 1350 degrees Fahrenheit.

5. A process of treating aluminous siliceous material which comprises sintering a mixture containing the material, calcium carbonate, a sodium compound and carbon, boiling said mixture in water to obtain in solution alumina in excess of that combined with the sodium in the sintered mixture, drying the mixture, adding ammonium chloride and calcium carbonate, heating to approximately 1350 degrees Fahrenheit, and then lixiviating the resulting substance with water to obtain sodium aluminate.

6. A process of treating aluminous siliceous material which comprises mixing together with a quantity of the material approximately twice as much sodium compound than the material and a less quantity of calcium carbonate than the material, sintering the mixture, boiling in water to obtain in solution alumina in excess of that combined with the sodium in the sintered mixture, drying the mixture, adding thereto ammonium chloride and calcium carbonate, subjecting the resulting mixture to a temperature not to exceed 1350 degrees Fahrenheit, and subsequently lixiviating the resulting substance in water to free sodium aluminate without contamination by silica or its compounds.

7. In a process of treating aluminous siliceous material which comprises sintering a mixture containing the material, calcium carbonate and a sodium compound, adding to the resulting mixture ammonium chloride and calcium carbonate, heating the resulting mixture to a temperature approximating 1350 degrees Fahrenheit, and then separating the resulting substance to free sodium aluminate.

ELBERT E. FISHER.